D. T. BURRELL.
Lamp for Heating Curling Irons, &c.
No. 46,775.  Patented March 14, 1865.
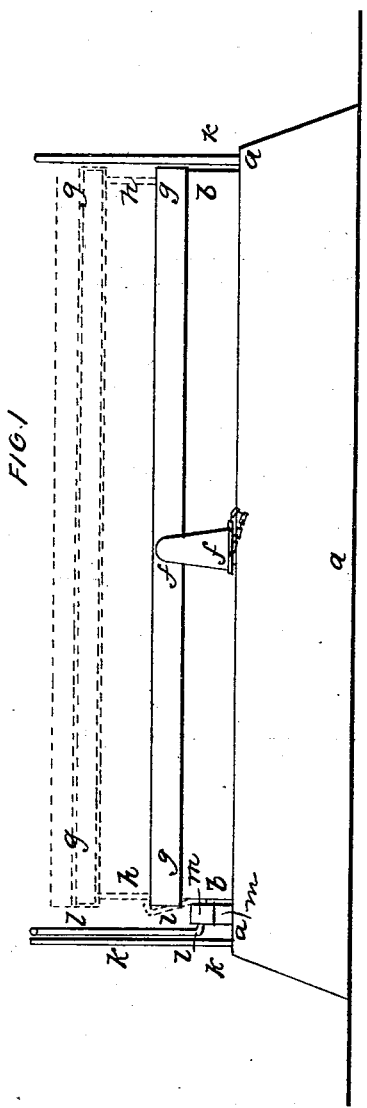
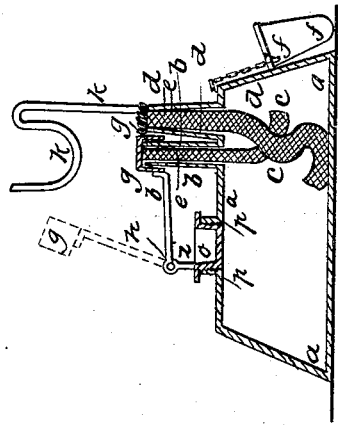
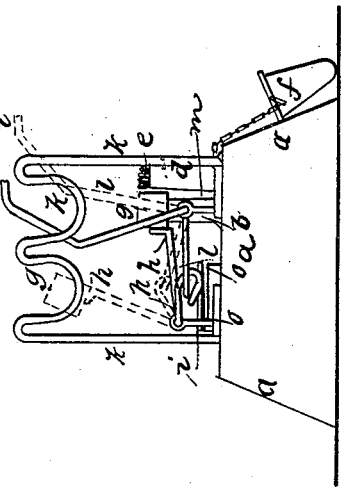
WITNESSES
Saml. M. Barton
George W. Mann
INVENTOR
David T. Burrell
by his Atty
Joseph Garrett

UNITED STATES PATENT OFFICE.

DAVID T. BURRELL, OF BRIDGEWATER, MASSACHUSETTS.

LAMP FOR HEATING CURLING-IRONS, &c.

Specification forming part of Letters Patent No. 46,775, dated March 14, 1865.

*To all whom it may concern:*

Be it known that I, DAVID T. BURRELL, of Bridgewater, in the county of Plymouth and State of Massachusetts, have invented certain new and useful Improvements in Lamps for Heating Curling and other Irons; and I do hereby declare that the following description, taken in connection with the accompanying plate of drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The present invention relates to certain new and useful improvements in lamps for heating curling and other irons, by which the operaration is performed in an automatic manner and at less expense than has been attained in lamps heretofore in use.

In the present invention these advantages are obtained by arranging at each end of the box or lamp containing the fluid or spirits a series of devices so constructed that when the iron to be heated is placed upon or taken from them it causes a cover to which they are attached to be lifted from or shut over a wick contained in a tube extending the length of the box. A self-acting power is thus attained for operating the cover, which, when the iron to be used is lifted from its frame or support, closes of itself and extinguishes the flame of the large wick. When the cover is raised, the larger wick is ignited by the flame of a small wick in front of it, which is kept constantly lighted. Thus, by only burning the large wick during the time the iron is being heated, a great saving in the use of the fluid or spirits is accomplished.

I will now proceed to describe my improvements, together with the arrangement and operation of the parts by which the above results are effected.

My improvements are represented in the accompanying plate of drawings, of which Figure 1 is an elevation, Fig. 2 a side view, and Fig. 3 a central vertical transverse section, of my improved lamp.

*a a a* in the drawings represent a box or reservoir containing the fluid or spirits, connected with which and extending throughout its length is a main tube, *b b*, through which a main wick, *c c*, passes, and a small tube, *d d*, containing a small wick, *e e*, and having an extinguisher, *f f*, the two wicks *c c* and *e e*, being so placed as to be in contact with each each other, or nearly so. A cover or extinguisher, *g g*, is attached to arms *h h*, that turn in standards *i i*, fixed to the top of the box *a a*. At each end of the box *a a* are affixed frames or supports *k k*, for the purpose of holding the iron. *l l* is a bent lever-arm extending downward from the top of the frame *k k*, and passing through a standard, *m m*, and operating upon the arm *h h*. *o o* is a screw-plug working in a female screw of an aperture, *p p*, through which the fluid or spirit is admitted.

From the foregoing description, reference being made to the drawings, it will be seen that by placing the iron or other implement to be heated upon its support or frame *k k* it presses upon the lever-arm *l l*, causing it to operate upon the arm *h h* in such a manner as to raise the cover or extinguisher *g g*, (as shown by the dotted lines in the drawings,) to which it is attached, and the cover *g g* being removed from the tube *b b*, the wick *c c* is exposed and becomes ignited from the flame of the wick *e e*, which is kept constantly lighted in the small tube *d d*. When the iron is removed, the pressure on the lever-arm *l l* is relieved, and the cover *g g* falls from its own weight upon the tube *b b*, and extinguishes the flame of the wick *c c* and cuts off the communication between the two flames. Thus, by merely putting on and taking off the iron an automatic action is produced which causes the cover *g g* to be raised or lowered and the main wick *c c* to be lighted or extinguished accordingly; and thus the consumption of the burning liquid by the main wick *c c* only takes place during the time the object to be accomplished—namely, the heating of the iron— is effected, thereby effecting a great saving in the cost of the operation.

Having thus described my improvements, what I claim as my invention, and desire to have secured to me by Letters Patent, is—

1. An apparatus for heating irons, &c., operating automatically, substantially as described, and for the purposes specified.

2. The arrangement and combination of the main and small wicks $c\ c$ and $e\ e$ and extinguisher $g\ g$, actuated so as to be raised and lowered by placing the iron or other implement upon or removing it from the apparatus, substantially as described.

DAVID T. BURRELL.

Witnesses:
JOSEPH GAVETT,
JOSIAH BACON.